Jan. 10, 1933.  H. T. LYMAN, JR  1,893,780
ELECTRIC REGULATOR
Filed April 17, 1931

Inventor:
Harold T. Lyman Jr.
by Charles V. Tullar
His Attorney.

Patented Jan. 10, 1933

1,893,780

UNITED STATES PATENT OFFICE

HAROLD T. LYMAN, JR., OF SCHENECTADY, NEW YORK, ASSIGNOR TO GENERAL ELECTRIC COMPANY, A CORPORATION OF NEW YORK

ELECTRIC REGULATOR

Application filed April 17, 1931. Serial No. 530,886.

My invention relates to apparatus for regulating an electrical condition of an alternating current circuit and more particularly to an electrical regulating apparatus utilizing electric valves which is particularly suitable for regulating the voltage of an alternating current feeder circuit.

Heretofore there have been devised numerous arrangements for regulating the voltage or other electrical condition of an alternating current circuit. Certain of these arrangements involve the use of contacts and other moving parts which tend to become unreliable in operation and are subject to wear and other deterioration in use. Certain other regulating apparatus have been devised utilizing electric valves for effecting the desired regulation. Examples of this latter type are disclosed and claimed in the copending applications of A. Boyajian, filed April 17, 1931, Serial No. 530,880, Alan S. FitzGerald, filed April 17, 1931, Serial No. 530,895, and G. W. Garman filed April 17, 1931, Serial No. 530,881, all assigned to the same assignee as the present application. My invention relates to the type of regulating apparatus disclosed in the above mentioned applications which broadly claim certain features of the apparatus disclosed in this application.

It is an object of my invention to provide an improved regulating apparatus utilizing electric valves which is simple and economical in operation and by means of which any desired fineness of regulation may be secured.

It is another object of my invention to provide an improved regulating apparatus utilizing electric valves in which any harmonics of current or voltage occasioned by the use of electric valves will be substantially suppressed from the regulated circuit.

In accordance with my invention I provide an alternating current circuit with a booster transformer and energize the primary winding of this transformer from an impedance bridge. Each of two adjacent arms of this impedance bridge includes a pair of electric valves reversely connected in parallel and the conductivity of these valves is controlled by adjusting the phase relation between the anode potentials and the grid potentials of the valves. One diagonal of this bridge is connected across the supply circuit while the booster transformer is energized across the other diagonal. A filter circuit is associated with the impedance bridge for suppressing the harmonics due to the use of phase control of the grid potentials of the electric valves.

Figure 1:
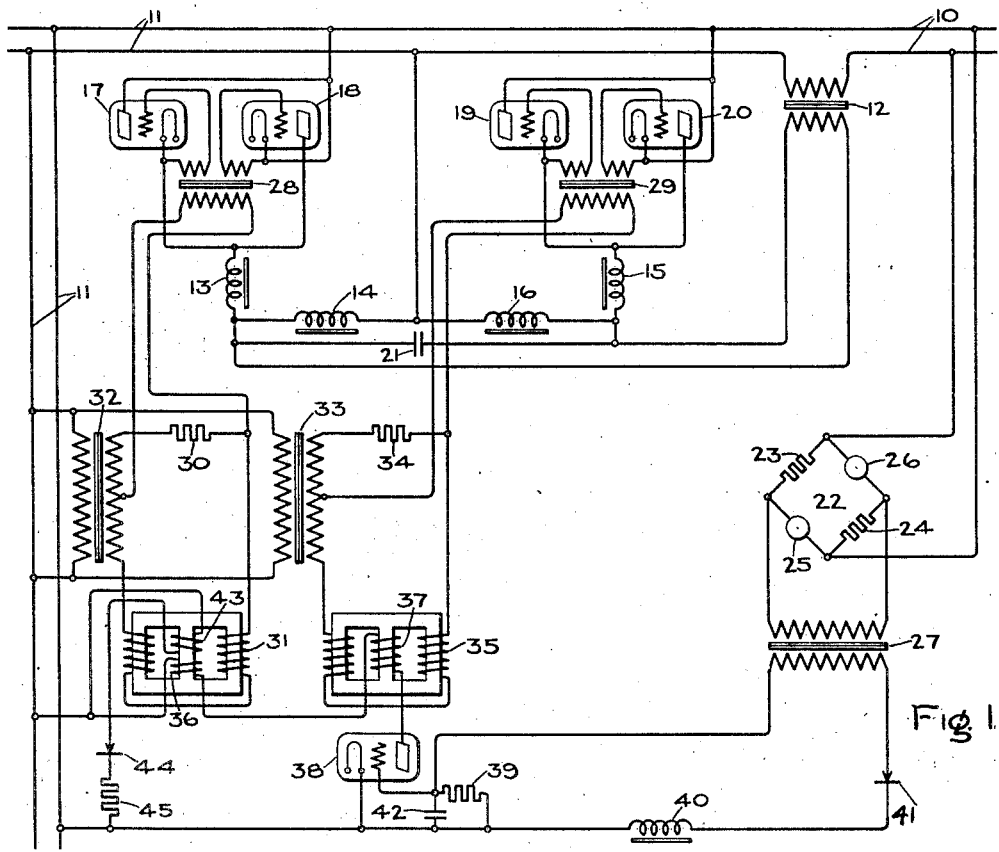
Figure 2:
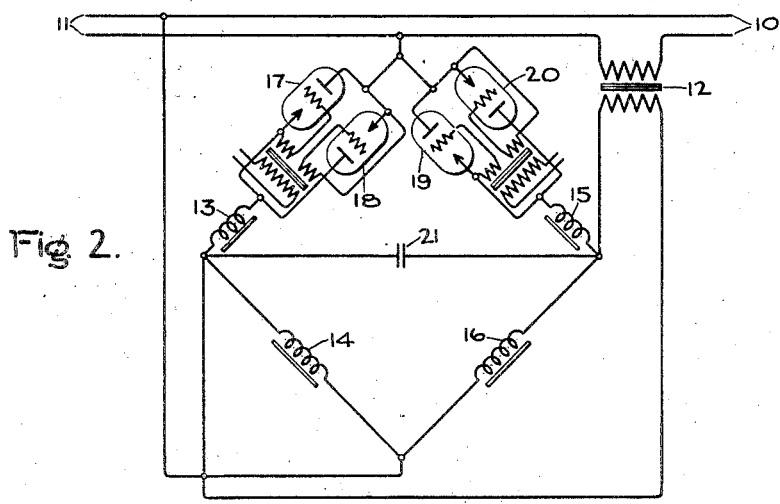

For a better understanding of my invention together with other and further objects thereof, reference is had to the following description taken in connection with the accompanying drawing and its scope will be pointed out in the appended claims. Fig. 1 of the accompanying drawing is a diagrammatic representation of my invention as applied to an arrangement for maintaining constant the voltage of an alternating current feeder circuit, while Fig. 2 is a simplified drawing of the power circuit.

Referring now to the drawing, I have illustrated an apparatus for regulating the voltage of an alternating current load circuit 10 energized from an alternating current supply circuit 11. This apparatus comprises a booster transformer 12 provided with a secondary winding interconnecting the circuits and with a primary winding connected across one diagonal of an impedance bridge. The impedance bridge may be visualized more clearly by referring to the diagram of Fig. 2. The impedance bridge comprises two adjacent arms made up of reactors 14 and 16, respectively, and two adjacent arms made up of a reactor 13 and a pair of electric valves 17 and 18 reversely connected in parallel, and a reactor 15 and a pair of electric valves 19 and 20 reversely connected in parallel, respectively. The electric valves 17 to 20 inclusive are each provided with an anode, a cathode, and a control grid and may be of any of the several types well known in the art, although I prefer to use valves of the vapor electric discharge type in which the starting of current in a valve is determined by the potential on its control grid but in which the current flowing through the valve can be interrupted only by reducing its anode potential below the critical value. A capacitor 21 is connected across the diagonal of the bridge from which the primary winding of the transformer 12 is energized.

The grids of the electric valves 17 to 20 inclusive may be controlled manually to produce the desired regulation, or they may be controlled automatically in response to variations in the voltage of the load circuit 10. For the sake of completeness, an automatic grid control circuit will be described, although this circuit comprises no part of my present invention but is disclosed and claimed in a copending application of A. S. FitzGerald and F. L. Gaines, Serial No. 530,888 filed April 17, 1931, assigned to the same assignee as the present application. This grid control circuit comprises in general a voltage responsive element for indicating a departure of the voltage of the feeder circuit from normal, a phase shifting device for controlling the phase angle between the grid and anode potentials of the electric valves, and means for actuating the phase shifting circuit in one direction when the voltage is high, in the other direction when it is low, and for holding it steady when the voltage is correct. The voltage responsive element comprises a bridge 22 having a pair of opposite arms 23 and 24, which are preferably resistors having substantially zero current-resistance characteristics, and a pair of opposite arms 25 and 26 which are preferably resistance devices having very high current-resistance characteristics, either positive or negative, such for example, as ballast lamps examples of which are well known in the art. One diagonal of the voltage responsive bridge is energized across the load circuit 10, while the other diagonal is connected to the primary winding of a control transformer 27.

In order to control the conductivity of the valves 17 to 20 inclusive, the grids of these valves are connected to their respective cathodes through oppositely connected secondary windings of grid transformers 28 and 29 respectively. The primary winding of grid transformer 28 is energized from a static phase shifting circuit comprising a resistor 30 and a saturable reactor 31 connected across the secondary winding of a transformer 32, the primary winding of which is connected to the supply circuit 11. The primary winding of transformer 28 is preferably connected between the electrical midpoint of the secondary winding of transformer 32 and the junction between the resistor 30 and reactor 31. Similarly, the primary winding of grid transformer 29 is energized from a phase shifting circuit comprising a similarly connected transformer 33, resistor 34 and saturable reactor 35. The reactors 31 and 35 are provided with saturating windings 36 and 37, respectively, which are connected in series across the supply circuit 11 through an electric valve 38. The valve 38 is preferably of the high vacuum pure electron discharge type. The control grid of electric valve 38 is connected to its cathode through a resistor 39 which is included in the circuit of the secondary winding of the control transformer 27 in series with a reactor 40 and a unilaterally conductive device, shown as a contact rectifier 41. A capacitor 42 may be connected in parallel to the resistor 39 to smooth out any ripples in the potential across it due to the flow of rectified current from the transformer 27. The reactor 31 is also provided with a second saturating winding 43 differentially wound with respect to the saturating winding 36 and energized from the supply circuit 11 through a unilaterally conductive device, shown as a contact rectifier 44, and a resistor 45.

In explaining the operation of the above described apparatus the operation of the power circuit per se will be considered first. Referring more particularly to Fig. 2, the two pairs of valves 17 and 18, and 19 and 20, respectively, comprise the equivalent of two impedances, the magnitude of which is determined by the phase relation between the grid and anode potentials of the valves. For the purposes of explanation, it will be assumed that, initially, the potentials of the grids of the several valves lag their anode potentials by equal angles so that the effective impedance of the pair of valves 17 and 18 is equal to the effective impedance of the valves 19 and 20. The reactors 13 to 16 inclusive are so proportioned that the impedance bridge, as a whole, is now balanced. Under these conditions no potential difference exists across the diagonal which is connected to the primary winding of the booster transformer 12 and the voltage of the load circuit 10 will be equal to that of the supply circuit 11, neglecting the impedance drop through the series transformer 12. If, now, the voltage of the circuit 10 tends to drop, due to an increase in load or for any other cause, the grid potentials of the valves 17 and 18 will be advanced with respect to their anode potentials while the grid potentials of the valves 19 and 20 will be correspondingly retarded with respect to their anode potentials, i. e. the effective impedance of the valves 17 and 18 is decreased while that of the valves 19 and 20 is increased. The impedance bridge is now out of balance and the difference potential across its diagonal connected to the primary winding of the booster transformer 12 will raise the potential of the load circuit 10 to normal. Obviously, with an increase in the voltage of the circuit 10 above normal, the reverse operation will take place.

As will be well understood by those skilled in the art, the current passed by the valves 17 to 20 inclusive, consists of a series of chopped half sine waves, that is, half sine waves with their initial portions deleted. The result of this chopping of the sine wave of fundamental frequency is to produce a number of odd harmonics which, if allowed to flow into the load circuit 10, would be highly objectionable. It has been found that, by connecting the capacitor 21 across the diagonal of the impedance bridge in parallel to the primary winding of transformer 12, the amplitude of the odd harmonics delivered to the load circuit may be limited to a permissible value. Electric valves 17 to 20 inclusive may be considered, for the purpose of explanation, as harmonic generators which are loaded, in series with reactors 13 and 15, through three parallel circuits comprising respectively capacitor 21, reactors 14 and 16 and the primary winding of transformer 12. However, the capacitor 21 offers virtually a short circuit for the higher harmonics while the impedance of the other two parallel paths becomes very high for these harmonics.

The operation of the grid control circuit to produce the desired regulation is as follows: The voltage responsive bridge 22 normally is unbalanced in such a way as to impress a negative potential upon the grid of the valve 38 by means of the control transformer 27, the rectifier 41 and the resistor 39, the reactor 40 and the capacitor 42 serving merely to smooth out the ripples of rectified current. Electric valve 38 preferably has a negative grid potential characteristic, that is, its full range of conductivity may be obtained by varying its grid potential within predetermined limits of negative potential. The winding 43 is differentially wound with respect to the winding 36 and is of an equal number of turns. The resistance of resistor 45 is equal to that of the valve 38 in the condition of maximum conductivity so that, under this condition, the core of the reactor 31 is completely unsaturated. Assume now that the voltage of the load circuit 10 is normal and that the unbalance of the bridge 22 is just sufficient to maintain the proper phase relation between the grid potentials and the anode potentials of the valves 17 to 20 inclusive, so that the proper amount of buck or boost is applied to the transformer 12 for existing load conditions of the circuit 10. If, now, the voltage of the circuit 10 should tend to drop, due to an increase in load or for any other cause, the voltage responsive bridge 22 will become more unbalanced so that a larger current will flow through resistor 39 from the control transformer 27 and a higher negative potential will be impressed upon the grid of valve 38. This will result directly in a decrease in the saturation of the core of reactor 35 and a decrease in the current flowing in the saturating winding 36 with a resulting increase in the saturation of the core of reactor 31 due to the differential winding 43. A decrease in the saturation of the reactor 35 will increase its impedance with the result that the phase of the potentials supplied from the phase shifting circuit comprising resistor 34 and reactor 35 to the grids of electric valves 19 and 20 will be retarded with respect to the anode potentials of these valves and their effective impedance will be increased. At the same time, as the saturation of the core of reactor 31 is increased, its impedance will be decreased and the phase of the potentials applied to the grids of the valves 17 and 18 will be advanced with respect to their anode potentials and the effective impedance of these valves will be decreased. The impedance bridge is now unbalanced in such a direction as to energize the primary winding of booster transformer 12 to bring the voltage of the load circuit 10 back to normal. Obviously, with an increase in the voltage of load circuit above normal, the reverse operation will take place.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, an impedance bridge including a pair of electric valves, means for controlling the potential of said load circuit in accordance with the unbalance of said bridge, and means for regulating the conductivity of said valves.

2. In combination, an alternating current supply circuit, a load circuit, an impedance bridge two arms of which each include a pair of electric valves reversely connected in parallel, means for controlling the potential of said load circuit in accordance with the unbalance of said bridge, and means for regulating the conductivity of said valves.

3. In combination, an alternating current supply circuit, a load circuit, an impedance bridge two adjacent arms of which each include a pair of electric valves reversely connected in parallel, one diagonal of said bridge being connected across one of said circuits, means for controlling the potential of said load circuit in accordance with the unbalance of said bridge, and means for regulating the conductivity of said valves.

4. In combination, an alternating current supply circuit, a load circuit, an impedance bridge including a pair of electric valves, one diagonal of said bridge being connected across said supply circuit, a booster transformer having a secondary winding connected between said supply circuit and said load circuit and a primary winding connected across the other diagonal of said bridge, and means for regulating the conductivity of said valves.

5. In combination, an alternating current supply circuit, a load circuit, an impedance bridge two adjacent arms of which each include a pair of electric valves reversely connected in parallel, one diagonal of said bridge including the junction between the two pairs of valves being connected across said supply circuit, a booster transformer having a secondary winding connected between said supply circuit and said load circuit and a primary winding connected across the other diagonal of said bridge, a capacitor connected across the last mentioned diagonal, and means for regulating the conductivity of said valves.

In witness whereof, I have hereunto set my hand.

HAROLD T. LYMAN, Jr.